United States Patent

[11] 3,542,011

| [72] | Inventor | Peter Langenbeck |
| | | Norwalk, Connecticut |
| [21] | Appl. No. | 647,835 |
| [22] | Filed | June 21, 1967 |
| [45] | Patented | Nov. 24, 1970 |
| [73] | Assignee | Daniel H. Bobis |
| | | Newark, New Jersey |

[54] APPARATUS FOR MEASURING AND MONITORING BLOOD PRESSURE
10 Claims, 20 Drawing Figs.

[52] U.S. Cl. .................................................. 128/2.05, 73/388
[51] Int. Cl. ..................................................... A61b 5/02
[50] Field of Search ........................................ 128/2.05; 73/388, 410; 350/162; 356/169

[56] References Cited
UNITED STATES PATENTS

| 2,149,690 | 3/1939 | Snyder .......................... | 128/2.05 |
| 2,720,113 | 10/1955 | Statham ........................ | 128/2.05X |
| 3,056,401 | 10/1962 | Greenspan et al. ............. | 128/2.05 |
| 3,100,997 | 8/1963 | Lorenz .......................... | 73/388 |

Primary Examiner—William E. Kamm
Attorney—Popper, Bain & Bobis

ABSTRACT: A blood pressure measuring apparatus of the type having a pump, pressure release valve, cuff pressure transducer and gauge wherein the transducer is a differential transducer employing a flexible member directly subjected to the pressure in the conduit leading to the cuff on one side and through an elongated capillary tube on the other side and wherein the pressure gauge may be a standard pneumatic gauge a flashing light, a moire fringe-producing device, or a pneumatic gauge with markers or relay-operated lights.

PETER LANGENBECK
INVENTOR.

Patented Nov. 24, 1970

PETER LANGENBECK
INVENTOR.

BY Pepper, Bain & Bobis
ATTYS

Patented Nov. 24, 1970

3,542,011

PETER LANGENBECK
INVENTOR.

BY *Popper, Bain & Bobis*

*Attys*

Patented Nov. 24, 1970
3,542,011
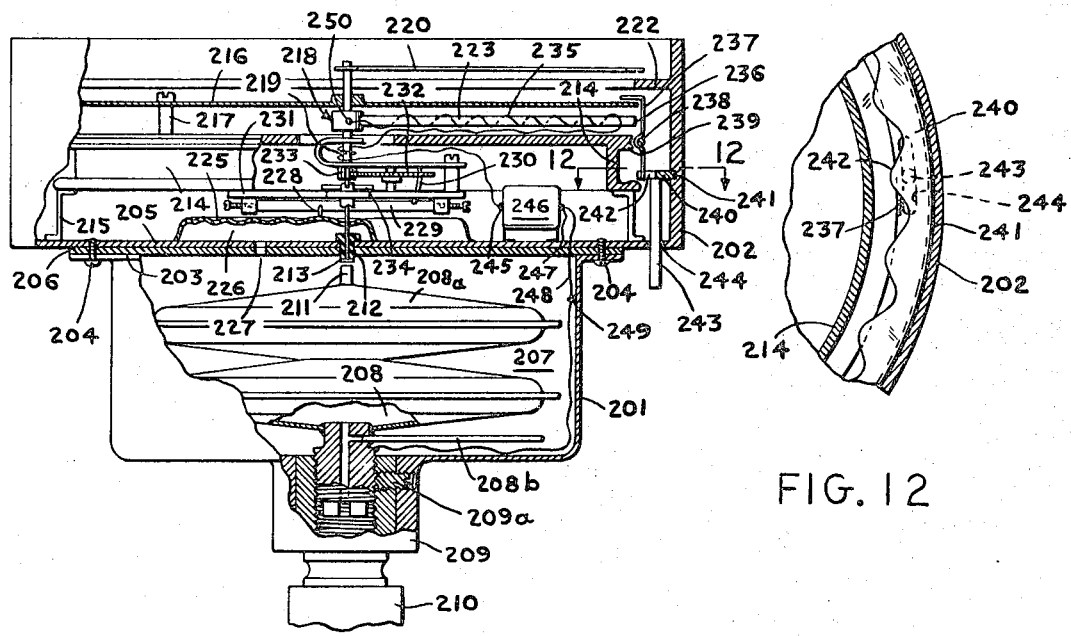
FIG. 11
FIG. 12
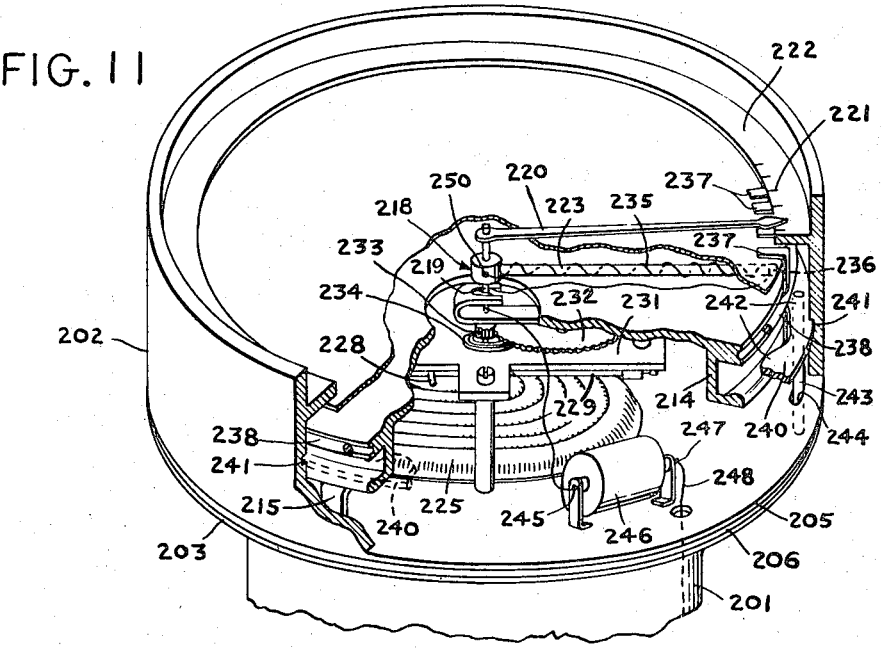
FIG. 15
PETER LANGENBECK
INVENTOR.
BY *Popper, Bain & Bobis*
*Attys*

PETER LANGENBECK
INVENTOR.

PETER LANGENBECK
*INVENTOR.*

APPARATUS FOR MEASURING AND MONITORING BLOOD PRESSURE

This invention relates to instrumentation for measuring, monitoring and indicating pressure and the variations in pressure which occur in a fluid system.

It is more particularly directed to a means for measuring, monitoring and indicating pulsating blood pressure and blood pressure variations such as the systolic and diastolic blood pressure variations in the respective circulatory systems of human beings.

PRIOR ART

The reading of maximum (systolic) and minimum (diastolic) pressure values of the blood in the circulatory system of a human being utilizing the Korotkow pressure oscillations by the conventional and well known Riva-Rocci Sphygmomanometer and Stethoscope technique, is a well known expedient in the art of measuring human blood pressure.

This clinical instrument and the taking of blood pressure in accordance with this method; as well as the disadvantages inherent in the method; are described in great detail in U.S. Pat. No. 3,056,401.

In U.S. Pat. No. 3,056,401 there is presented one form of differential pressure transducer adapted to coact with a suitable electrical recording means.

In the present invention, the differential pressure transducer differs from that disclosed in U.S. Pat. No. 3,056,401. This difference in construction permits the design of a relatively simple, low weight portable type blood pressure measuring means which can be manufactured at an extremely low cost.

Further because of the relative accuracy of the device the differential pressure transducer can be utilized with unusual equipment including electrical or electronic indicating equipment and devices in a form readily adaptable because of limited size requirements and simplicity to individual use by doctors or for other uses such as in operating rooms, hospitals, clinics and other medical facilities in which more particularly examinations of human beings and measurements of blood pressure and circulatory systems are a necessary piece of clinical information required in connection with the treatment of the patient being examined or diagnosed.

SUMMARY OF THE INVENTION

Thus, the present invention provides a device for measuring systolic and diastolic blood pressures in a circulatory system wherein an inflatable cuff, and operated pump means for inflating the same, and a manually operated bleed valve for bleeding off the applied pressures in the inflatable cuff at a predetermined rate coact with a differential pressure transducer having at least two chamber means formed therein with at least one common flexible wall means therebetween, one of said chamber means is adapted to act as a reference chamber and has a capillary means coacting therewith so that pressure pulses acting in the pressure fluid in the inflatable cuff as the applied pressure in the cuff, will produce a differential pressure sufficient to actuate the common flexible wall means of the pressure transducer which wall means is further connected to a signal means adapted to indicate the relative movement of said flexible wall means and further calibrates it in terms of the pressure of the circulatory system being measured whereby such signal means can be read directly to provide the desired measurements of the systolic and diastolic blood pressure in the circulatory system.

It is the principal object of the present invention to provide an improved device for measuring the systolic and diastolic blood pressures in a circulatory system in which the measurements can be read directly and do not require sensory interpretation by the person using the apparatus.

It is another object of the present invention to provide an improved device for measuring systolic and diastolic blood pressures in a circulatory system which is simple to utilize and relatively cheap to manufacture and will give accurate measurements at all times with consistent reliability.

It is a further object of the present invention to provide a device for monitoring and measuring blood pressures in a circulatory system in which the direct measurements will be automatically recorded and continuously displayed until erased by the operator of the device.

Accordingly, the present invention consists in the features of construction, combination of elements and arrangements of parts which will now be described with respect to the accompanying drawings in which several possible embodiments of the invention are illustrated.

IN THE DRAWINGS

FIG. 11 is a further form of once present invention wherein the absolute pressure transducer coacts with an electrical circuit and an so as to operated mechanical gauge means utilizing movable and resettable tabs for indicating and recording pressures when the pulse oscillations occur in the circulatory system being monitored or measured.

FIG. 12 is a fragmentary plan view of the reset mechanism for the form of the invention shown in FIG. 11.

FIG. 15 is a partial perspective view of the form of the invention shown in FIG. 11 broken away in part to show a portion thereof in vertical section.

In the Riva-Rocci blood pressure measurement technique utilizing the conventional sphygmomanometer and stethoscope the appearance of pulse noises indicates the maximum or systolic pressure and their disappearance, the diastolic or minimum blood pressure of the blood in the circulatory system being measured. For diagnostic purposes these points are important to the doctor or other technicians utilizing this information.

The absolute pressure of air in the cuff is measured by a conventional U-tube type mercury manometer and the drop or variations in pressure in the cuff are also reflected in the manometer.

Figure 1B:
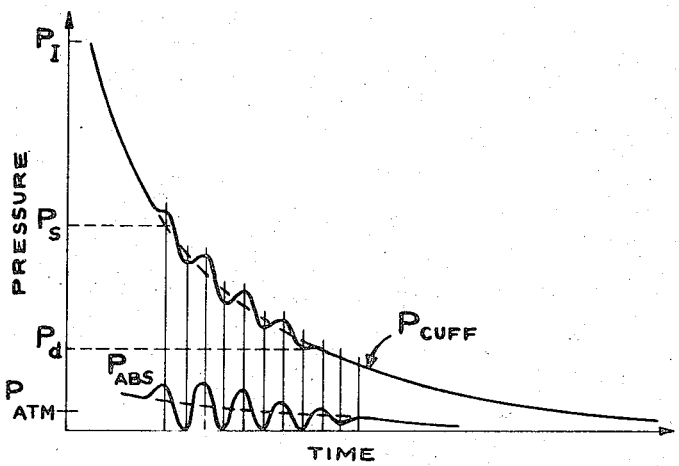
FIG. 1b is a graphical representation of pressure loss as a function of time in the conventional cuff arrangement depicted in 1a and illustrates the Korotkow pulse oscillations on the pressure loss curve for the cuff and the curve for the absolute pressure plus the pressure of the pulses when these oscillations occur.
Figure 1A:
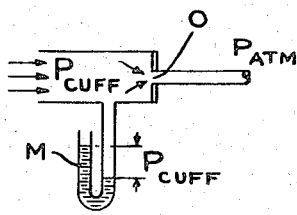
FIG. 1a is a schematic representation showing the conventional pressure cuff and its orifice to atmosphere.

Referring to the drawings, in FIG. 1a this is diagrammatically illustrated with the pressure in the cuff being indicated as $P_{cuff}$ the orifice through which the pressure air escapes to atmosphere being designated O and the standard atmosphere or ambient pressure being designated $P_{ATM}$. The point at which the conventional mercury U-tube type manometer M is attached to measure the pressure conditions in the cuff is also illustrated.

FIG. 1b shows the curve of the pressure drops in the cuff for this conventional clinical type sphygmomanometer when it is in use. Thus, the initial pressure established in the cuff by the hand pump is indicated as $P_I$ and is generally in the order of 250 mmHg. The pressure in the cuff is gradually reduced over a period of time generally in the order of 1 to 2 minutes or less. This is accomplished by means of a thumb screw which can be manually operated to open an orifice to atmosphere to permit the pressure air to gradually escape from the cuff. This orifice is the orifice O illustrated in FIG. 1a of the drawings.

The pressure curve shown in FIG. 1b shows the point at which the Korotkow pulse oscillations begin, designated $P_s$ and representing the maximum or systolic pressure of the blood, in the circulatory system being measured. The point $P_d$ at which the Korotkow pulse oscillations terminate represents the minumum or diastolic pressure of the blood in the circulatory system being measured.

As was above stated, the details of this conventional sphygmomanometer system and how it is operated and read, and the meaning of the pulses or oscillations between the points $P_s$ and $P_d$ are fully described in U.S. Pat. No. 3,056,401 and accordingly require no further description herein.

In the present invention, the cuff and hand pump with the manually adjustable orifice is utilized in the same manner as described for the conventional sphygmomanometer. However, by providing a differential pressure transducer, to coact with the cuff which relates the cuff pressure to an auxiliary pressure established in a space of predetermined volume which auxiliary pressure is substantially similar and varies at a substantially similar rate to the pressure in the cuff, the differential pressure transducer can be adapted to measure the net differential pressure between the absolute pressure in the cuff and the absolute pressure in the cuff plus the pressure produced by the Korotkow pulse oscillations.

This differential pressure can then be utilized to actuate a means which in turn can signal a conventional differential pressure gauge; an optical device or an electrical or electronic indicating and recording circuit as the case may be and as will be described hereinafter.

The differential pressure transducer of the present invention in substance acts to separate the net pressure increases in the cuff produced by the Korotkow pulse oscillations from the absolute pressure in the cuff by measuring the pressure in the cuff at the time the Korotkow pulse oscillations cause an increase over the absolute pressure in the cuff. This is accomplished through the auxiliary reference volume established as an equalizing or reference pressure which represents the instantaneous absolute pressure at that moment.

This provides a net differential pressure which can then be used directly to actuate a means for transmitting a signal to the coacting device with which the differential pressure transducer is associated and thus, provide a direct visual or electrical indication of the Korotkow pulse oscillations in the circulatory system being measured.

Figure 2B:
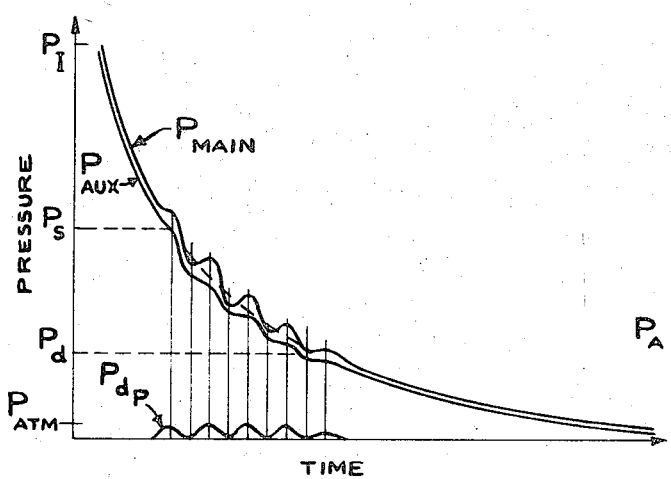
FIG. 2b is a graphical representation of pressure loss as a function of time in the pressure transducer illustrated in FIG. 2a and the net differential pressure measured due to the Korotkow pulses when these oscillations occur over the absolute pressure in the cuff.
Figure 2A:
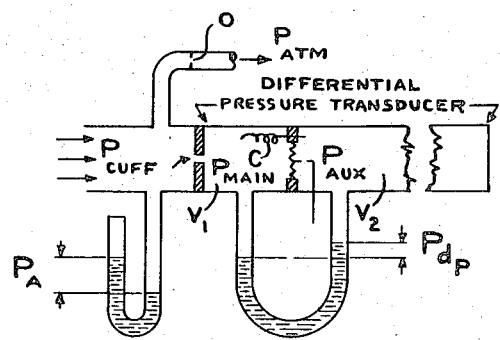
FIG. 2a is a schematic representation of a pressure transducer in accordance with the present invention.

In FIG. 2a, the operation of the differential pressure transducer of the present invention is diagrammatically illustrated. It utilizes the conventional arrangement wherein pressure in the cuff $P_{cuff}$ escapes to atmosphere $P_{ATM}$ through the orifice O as in FIG. 1a. The coacting pressure transducer is connected to the cuff and includes a main chamber and an auxiliary chamber. The main chamber and auxiliary chamber are so constructed and interrelated as to volume and size, as to permit the effect of absolute pressure to offset itself at these chambers and to enable a capillary C to be established of predetermined length as the means to limit the fluctuations in pressure in the auxiliary volume or chamber as is more fully described hereinafter.

In FIG. 2b, the respective pressure curves of the main chamber $P_{MAIN}$ and the auxiliary chamber $P_{AUX}$ of the differential pressure transducer as the pressure in cuff changes from its initial pressure $P_I$ of 250 mmHg. to atmosphere $P_{ATM}$ is represented graphically. The Korotkow pulse oscillations and the respective positions $P_s$ of the maximum or systolic pressure and the $P_d$ the minimum or diastolic pressure for the circulatory system being measured are also illustrated.

The graphical representation also shows the net differential pressure $P_{dp}$ measured by the differential pressure transducer as being solely the net increase over absolute pressure in the cuff caused by the Korotkow pulse oscillations thus, indicating that the absolute pressure of the blood in the circulatory system being measured has been balanced in the differential pressure transducer means of the present device when the Korotkow pulse oscillations occur.

A broad principal of differential pressure measurement is utilized by the pressure transducer in the device of U.S. Pat. No. 3,056,401. However, while applicant's differential pressure transducer accomplishes the same end result, for the same purpose namely transmission of signals to a suitable coacting system it differs in structure and operation therefrom as will be clear with respect to the forms of the invention hereinafter described.

FIGURE 3, FORM OF THE INVENTION

Figure 3:
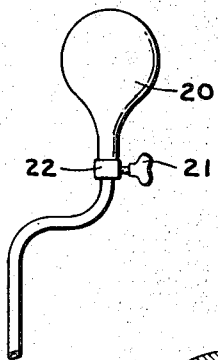
FIG. 3 shows a simple form of the present invention in which the pressure transducer coacts with an electrical circuit to actuate a visual signal.
Figure 3:
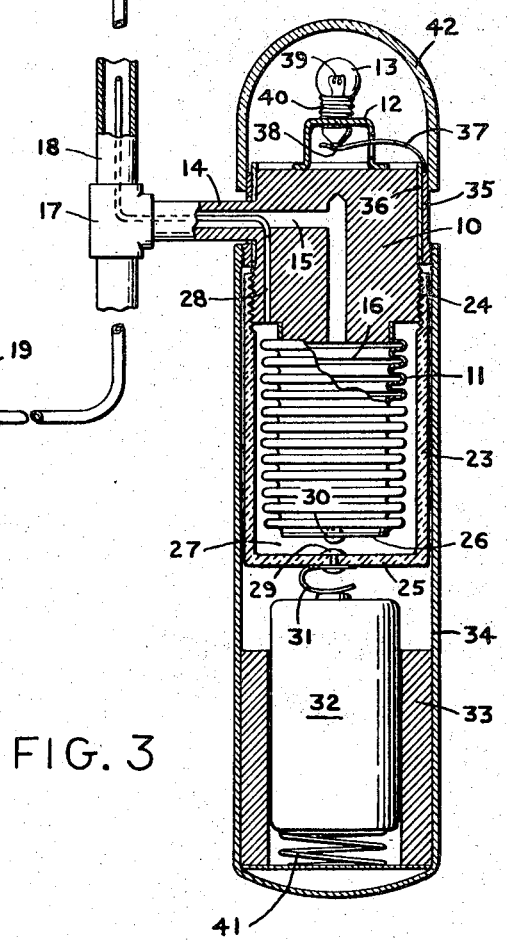

Thus, referring to FIG. 3, a device in accordance with the present invention is shown for electrically indicating the Korotkow pulse oscillations. It includes a main support or body member 10 of conductive material, a bellows means 11 at one end thereof and at the end remote from the bellows means 11 a lamp support 12 in which a lamp 13 is mounted. The body member 10 has a lateral projection 14 and in the lateral projection 14 and the body member 10 is the inlet passage 15 which communicates with the chamber 16 formed by the bellows mean 11 to provide means for delivering pressure air equivalent to the cuff pressure as is now described.

The lateral projection 14 and inlet passage 15 are connected by any suitable means such as the Tee 17 to the connecting conduit 18 between the arm cuff 19 and the hand pump 20 of the type which is utilized on a conventional sphygmomanometer. A manually operated thumb screw 21 controls a needle valve type orifice 22 through which air under pressure is delivered to and released from the arm cuff 19.

When the needle valve 22 is closed pressure air will be delivered by the hand pump 20 via conduit 18 to the arm cuff 19. After the arm cuff 19 is at a pressure of about 250 mmHg. the thumb screw 21 can be turned to open the needle valve 22 to permit pressure air to escape from the cuff. Further, by limiting the opening movement of the thumb screw 21 the needle valve 22 can be adjusted to any desired orifice size and thus regulate the rate the pressure air in the arm cuff 19 will escape so that the desired time interval can be obtained for measurement of the Korotkow pulse oscillations. This construction and operation and the measurement being made is so well known that it requires no further description herein.

Since the inlet passage 15 communicates directly with conduit 18 pressure air will also be delivered simultaneously to the chamber 16 in the bellows member 11 as is clearly shown in FIG. 3 of the drawings.

Connected to the body member 10 about the bellows means 11 is a cup like member 23 made of an electrically nonconducting material which is adapted by means of threads 24 to be adjusted relative the longitudinal axis of the support or body member 10 and bellows member 11 so that the transverse end 25 can be moved towards and away from the end 26 of the bellows means 11 for purposes which will appear clear from the descriptions of the operation of this form of applicant's device.

This construction forms a chamber 27 about the bellows means 11 which chamber can be varied in volume by the movement of the cup member 23 relative the bellow means 11.

Pressure air will be delivered to the chamber 27 through a capillary tube 28 which extends through the main body member 10 and inlet passage 15 into the communicating or connecting conduit 18 where the end remote from the chamber 27 is open to receive pressure air from the connecting conduit 18 and to deliver the same to the chamber 27.

The main chamber 16 and the auxiliary chamber 27 from the differential pressure transducer in the form of the invention shown in FIG. 3.

The capillary tube 28 is adjusted to provide optimum operation by fixing the length and cross-sectional area to control the flow of pressure fluid in and out of the space or chamber 27 for purposes which will appear clear hereinafter with reference to the operation of this form of the invention. the less For any given cross section of capillary tube selected the longer the length of the capillary tube 28 the less flow of pressure air into and out of the chamber 27 and the more sensitive the instrument will become. Conversely, the shorter the capillary tube the greater the flow of such pressure air into and out of chamber 27 and the less sensitive the instrument will be.

For each cross-sectional area of the capillary tube 28, an optimum length will be found to obtain proper operation of the elements forming the differential pressure transducer and the I.D. or the capillary tube 28 can change provided the I.D. of the capillary tube 28 is varied relative the volume of chamber 27 in accordance with the Hagen-Poiseville Law.

Further, the capillary device is not subject to becoming clogged due to dirt or moisture as will occur with an orifice type device as shown by the prior art transducers.

In the transverse wall 25 of the cuplike member 23 an adjustable contact 29 is provided. This contact 29 will coact with a movable contact 30 in the end wall 26 of the bellows means 11 when Korotkow pulse oscillations occur.

The adjustable contact 29 is connected to a spring clip 31 which will communicate with one end of a power source 32 such as a conventional 1.5 volt D-type dry cell battery utilized in flashlights.

The battery 32 is mounted in a battery holder 33 fitted in one end of a cover member 34 which is threadably mounted to a current conducting supporting sleeve 35 mounted about the upper end of the body member 10 but insulated therefrom by an insulating sleeve 36 all of which is clearly shown in FIG. 3 of the drawings. The conducting sleeve 35 has a spring clip 37 which communicates with one of the contacts 38 for the lamp member 13. The contact 38 communicates with one side of the lamp filament 39 and the other side of the filament 39 connects with the connecting and conducting means 40 of the lamp 13 which serves to mount the lamp 13 in the conductive mounting means 12 connected to the main body 10 of this form of the invention.

The contact side of the battery means 32 remote from the contact in engagement with spring clip 31 is connected by spring 41 to the conductive cover element 34.

In operation, the initial pressure which the hand pump 20 delivers to the cuff 19 will exist simultaneously in the main chamber 16 within the bellows means 11 and in the auxiliary chamber 27 of the differential pressure transducer because this pressure is delivered to these chambers by means of the inlet passage 15 and the capillary tube 28. Since the pressures in the respective chambers 16 and 27 will be equal the bellows means 11 will not move from the position as shown in FIG. 3.

When the thumb screw 21 is turned to open the orifice 22 so as to reduce the pressure in the cuff 19 as long as the pressure is reducing smoothly, this condition of equilibrium between the pressures in chamber 16 and chamber 23 will continue until the first pulse or oscillation occurs from that blood vessel of the circulatory system being measured which was initially occluded by the cuff 19. This point is designated as $P_s$ on the graph shown in FIGS. 2b of the drawings.

In effect, when this first pulse condition occurs an increase in the absolute pressure in the pressure cuff 19 will occur. This pressure is immediately transmitted by the pressure fluid to the chamber 16 in the bellows means 11 causing the bellows 11 to expand. This causes the increase in pressure being propagated through the capillary tube 28 into chamber 27 to lag because the instantaneous expansion of the bellows means 11 has momentarily compressed the volume of air present in the auxiliary chamber 27 and acts to balance the pressure across the capillary tube 28 or in substance balances the increase in pressure being propagated in the pressure fluid in the capillary tube 28 and the chamber 27.

For a short moment therefor, until the pulse pressure subsides no air flows into or out of the capillary tube 28.

As the pulse is completed, since the absolute pressure is decreasing, the bellows means 11 will move back into its balanced or zero position. However, because this decrease in pressure can now be propagated through the capillary tube 28 the position of the bellows means 11 will now be balanced as it was prior to the pulse.

Since the absolute pressure in the cuff is at all times being balanced across the bellows means 11, it is clear that the bellows means will only reflect the net difference in pressure between main chamber 16 and auxiliary chamber 27 or the increase over the absolute pressure caused by the pulse or oscilation in the blood vessel occluded by the cuff 19.

This bellows action repeats itself on each pulse oscillation until the pulses or oscillations disappear at the point indicated by $P_d$ in the FIG. 2b of the drawings.

Figure 4:
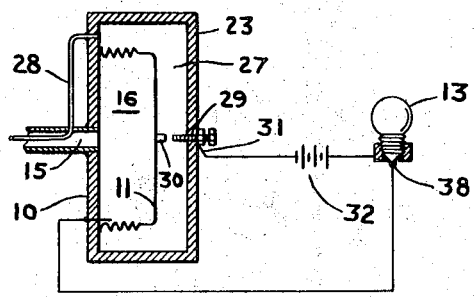
FIG. 4 is a schematic diagram of the electrical circuit of FIG. 3.

If on each such pulse, the relative position of the adjustable contact 29 and the movable contact 30 are properly positioned as by threadably adjusting the cuplike member 23, the bellows means 11 will act as a switch in an electrical circuit as is shown schematically in FIG. 4 of the drawings.

When the circuit schematically illustrated in FIG. 4 is closed by the movable contact 30 on bellows 11 being brought into engagement with the adjustable contact 29 current flows from the battery through the spring clip 31 contacts 30 and 29, the bellow means and main body 10 and support means 12 to the lamp 13 which by reason of the connection 38 to the conductive members 37 and 35 provide a complete circuit through the end cover 34 and spring 41 with the side of the battery remote from the end in engagement with the spring clip 31.

Thus, on each pulsation the lamp 13 will be lit with a duration corresponding to the duration of the pressure of the pulse or oscillation acting in the cuff 19.

A translucent cover 42 is provided to cover the lamp 13 and prevent any injury to the lamp in connection with the use of the present device.

FIGURE 5, FORM OF THE INVENTION

Figure 5:
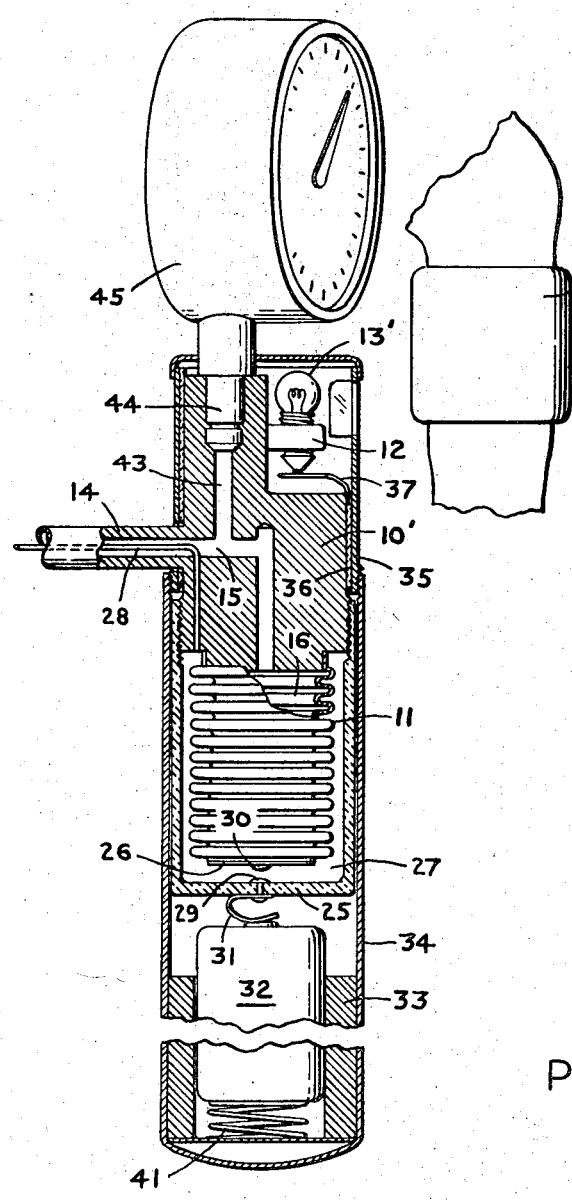
FIG. 5 is the same form of the invention shown in FIG. 3 with a pressure gauge to permit reading actual pressures in accordance with the visual signals.

FIG. 5 shows a device substantially identical to the device described in FIGS. 3 and 4 of the drawings.

In the form of the invention shown in FIG. 5 identical parts have been given the same numbers.

In this form of the invention, the main body support member 10 is modified so that a connecting conduit 43 communicates with the inlet conduit 15. At the end of the connecting conduit remote from the point which communicates with the inlet conduit 15, a connecting coupling 44 is provided for mounting an absolute pressure gauge 45 in the manner indicated.

Absolute pressure gauges of the type which can be utilized with the present invention are well known and easily purchasable on the open market.

This device differs from the device described in FIG. 3 only to the extent of providing visible pressure numbers so that measurements of the actual pressure values can be read when the instrument is in use. This absolute pressure gauge is the equivalent of the mercury manometer and the dial can be graduated to provide the readings in inches of mercury so that a practical clinical instrument is thus, provided for measuring blood pressure.

The device shown in FIG. 5 operates identical to the operation above described for the form of the invention shown in FIG. 3 and differs only to the extent that the differential pressure gauge 45 will reflect the actual pressure measurements at all times. The electrical indicating lamp 13 will reflect the point at which the pulses commence and terminate. The readings for the points can then be made directly from the gauge without the necessity of relying on the use of the stethoscope as has been the procedure with the conventional type sphygmomanometers in use today.

FIGURE 6 FORM OF THE INVENTION

Figure 6:
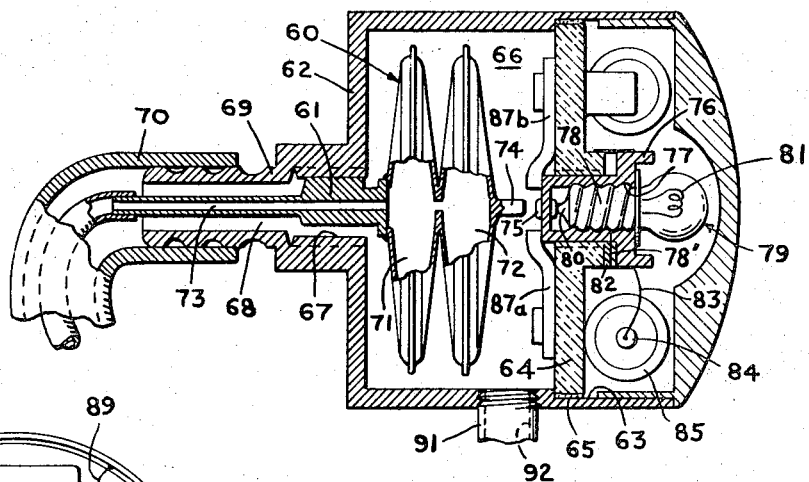
FIG. 6 shows the present invention utilizing another form of differential pressure transducer coacting with an electrical circuit to actuate a visual signal and is connected to gauge for reading pressures directly.

In the form of the invention shown in FIG. 6, a more compact instrument is provided than the form of the present invention as shown in FIGS. 3 and 5 of the drawings.

This is accomplished by forming the auxiliary chamber of the differential pressure transducer from a double aneroid type of pressure responsive member such as is shown at 60. The member 60 is mounted by the spider element 61 in one end of a housing means 62.

The housing means 62 is a cup-shaped element which is conductive and has a counterbore 63 formed in the open end thereof to receive a closure member 64 made of a nonconductive material. The closure member 64 is sealed to the open end of the housing means 62 by a suitable epoxy type resin or other adhesive as at 65 to form a chamber 66.

The spider element 61 for mounting the aneroid type member 60 is set in the splines 67 formed in the inlet passage 68 through a connecting boss 69 extending from the end of the housing means 62 remote from the closure member 64.

Inlet passage 68 communicates with the chamber 66 formed by the cup shaped housing 62 and its closure member 64 so that when the boss 69 is connected by means of the connecting conduit 70, to the line which delivers pressure fluid to a cuff (not shown), in substantially the same manner as is shown in FIG. 3, of the drawings for line 18 and cuff 19, then the pressure fluid acting in such cuff will be transmitted directly to the chamber 66 which is about the aneroid type members.

The chambers 71 and 72 in the aneroid type pressure member 60 are connected by means of the capillary tube 73 which lies substantially concentric to the inlet passage 68 which capillary tube 73 having its open end in communication with the pressure fluid acting in the conduit 70 will deliver this pressure fluid through the capillary tube 73 to the chamber 71 and 72 in the aneroid type member 60.

Since the aneroid type member will expand and contract at the end remote from the connected end, a contact 74 is provided which is movable therewith. The movable contact 74 contacts a stationary contact 75 which is mounted in a lamp holder 76 threadably adjustable relative the insulating closure member 64 so as to adjustably position the stationary contact 75 relative the movable contact 74.

Figure 7:
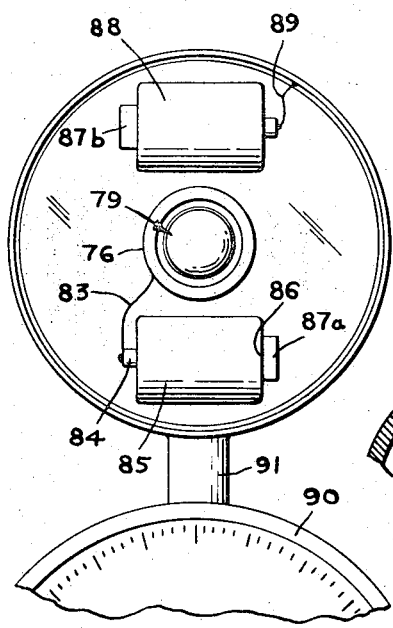
FIG. 7 is a front view of the form of the invention shown in FIG. 6.

The lamp holder 76 has a socket 77 formed therein to receive a threaded contact element 78 of lamp member 79 so that the contact 80 at the end of the lamp member 79 can be brought into engagement with the stationary contact 75 when the lamp 75 is mounted in assembled position. The filament 81 communicates between the contact 80 and the threaded contact element 78 in the conventional manner. The threaded contact element 78 serves to mount the lamp and communicates by the connecting line 78' to a conductive sleeve 82 in turn connected by line 83 to one terminal 84 of a battery means 85 as shown in FIG. 7.

The end 86 of the battery means remote from the contact 84 communicates through the connecting bus bars 87a and 87b to one end of a second battery 88 which in turn has the end remote thereof in communication with the conductive housing means 62.

In operation, as long as the cuff pressure is acting in the chamber 66 and in the respective chamber 71 and 72 which chambers form the differential pressure transducer of this form of the invention, the aneroid type members 60 will be in equilibrium and no movement will be transmitted to movable contact 74. However, when a pulse or oscillation occurs in the blood vessel occluded by the cuff the pressure increases over the absolute pressure in the cuff and is transmitted to chamber 66 compressing the aneroid type member so as to increase the pressure momentarily in the capillary tube 73. This momentary increase in pressure in the aneroid type member 60 prevents the flow of pressure fluid at the increased pressure from entering the capillary tube 73 and acting in the chambers 71 and 72. When the pulse in the blood vessel which caused the increased pressure in the cuff is completed, this momentary compression of the member 60 will terminate and with further decreasing of the pressure in the cuff the absolute pressure in the cuff and in chamber 66 will be transmitted to the chamber 71 and 72 of the aneroid member 60. This causes the member 60 to now expand so that the movable contact 74 will be brought into contact with the adjustable stationary contact 75 and when the equilibrium is established, the movable contact 74 will move out of engagement with the adjustable stationary contact 75 so that on the next pulse this operation can be repeated.

By reference to FIG. 4 the same circuit schematically illustrated there applies broadly to the circuit of the form of the invention shown in FIG. 6. The chambers 66 and combined chambers 71 and 72 act as the differential pressure transducer and actuate a switch so as to close the circuit between the batteries and the lamp 79 to light the lamp 79 each time that the circuit closes.

Thus, when movable contact 74 is brought into engagement with adjustable stationary contact 75 current will flow from the batteries to the sleeve 82 and the threaded mounting contact 78, thence to the filament 81 and, through the adjustable stationary contact 75 and movable contact 74 the aneroid pressure responsive member 60 and housing means 62 to the opposite side of the battery circuit.

Each time this occurs lamp 79 will light up and it is believed clear that with each fluctuation of the aneroid pressure responsive member 60 responsive to Korotkow pulses or oscillations, the lamp will be lighted.

As shown in FIGS. 6 and 7 an absolute pressure gauge 90 can be connected to the chamber 66 of the form of the invention described in FIG. 6 by any suitable means such as the addition of a coupling means 91 having a connecting passage 92. The differential pressure gauge will reflect the direct pressure readings in chamber 66 and if graduated in mms of mercury will give the actual blood pressure readings at the time that the lamp commences lighting and at the time that the lamp ceases to light. This will give the systolic and diastolic readings required during the clinical use of this type blood pressure measuring device.

FIGURE 8, FORM OF THE INVENTION

Figure 8:
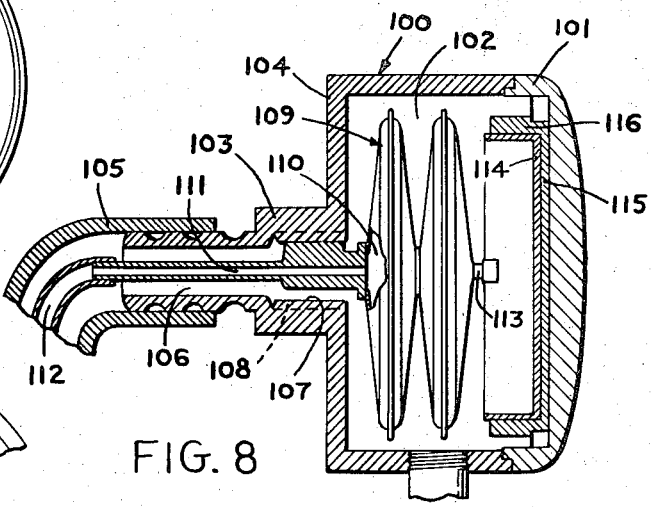
FIG. 8 shows another form of the present invention wherein the differential pressure transducer coacts with and actuates an optical device to provide visual signals of the Korotkow pulse oscillations.

FIG. 8 shows another form of the invention for using optical amplifiers visualizing the movement of the aneroid type member 60 or of depicting visually the relative displacement of the flexible wall of the differential pressure transducer of the present invention.

This is accomplished by having an optical amplifier actuated by the elements forming the flexible wall of the differential pressure transducer.

For example, a mirror can be fixedly connected to the flexible member of the differential pressure transducer so that the mirror can reflect a light beam which in turn can be observed on a ground glass so that deviations of the light beam from its zero position will reflect the Korotkow pulsations which are transmitted in the pressure fluid.

A simple optical amplifier can be obtained by using the well known "moire" effect produced by superposing on each other gratings of equal frequency and dimensions, preferably gratings on which dark strips and light strips or dark strips and transparent strips are equally spaced.

A suitable spatial relationship for these dark and light strips is for example a hundred lines per centimeter.

These superposed gratings shown interference fringes, i.e., "moire" fringes the mutual distance of which depends upon the angle between the gratings and the number of lines per centimeter.

The smaller the angle between the gratings, the wider and more sensitive the "moire" fringes will be and small displacements of the gratings relative each other will cause ample amplifications of the lines of the gratings to produce a visual change which can be calibrated and correlated to the actual pressure measurement by lines on the face of the instrument as will be understood by those skilled in the art.

Amplifications of 1 to 100 can be easily obtained.

The effect of this amplification is that a movement of 1/10 of a millimeter of one grating with reference to the other grating causes one "moire" fringe to move one centimeter across the field of vision for such optical amplifier.

Referring to FIG. 8, a differential pressure transducer is shown substantially similar to that above described for the form of the invention shown in FIGS. 6 and 7 as coacting with an optical amplifier of this type. The housing means of this device is generally designated 100 and is substantially cuplike in shape. A cover 101 at the open or mouth end of the cup closes the housing means 100 to form a chamber 102.

A coupling boss 103 formed at the transverse wall 104 of the housing means 100 remote from the cover 101 provides means for connecting the housing to a connecting conduit 105 so that inlet passage 106 in the coupling boss 103 which communicates between the chamber 102 and the connecting conduit 105 can deliver pressure air to the chamber 102 from a connecting line and pressure cuff as shown above in the form of the invention shown in FIG. 5.

Connected to the coupling boss 103, in a counterbore 107 by means of the splines 108 is a spider which serves to mount an aneroid type member 109 of the type conventionally used in barometers and easily purchasable on the open market.

The aneroid member 109 forms a chamber 110 which communicates by the capillary passage 111 and the capillary tube 112 connected thereto with the connecting conduit 105 in communication with the pressure conduit 18 providing pressure fluid to the cuff 19 as shown in FIG. 5. Thus, pressure acting in the cuff can be transmitted to the chamber 110 through the capillary tube 112 and capillary passage 111.

The chamber 102 and the chamber 110 for this form of the invention are the respective main and auxiliary chambers of the differential pressure transducer and the walls of the aneroid type member 109 provide the flexible wall which is moved responsive to the Korotkow pressure pulses or oscillations and will act to actuate the optical amplifier as will now be described.

The end of the aneroid type member 109 remote from the spider mounting means 108 is connected by a suitable connecting element 113 to one of the grating elements 114 of a "moire" type optical amplifier. The other element 115 being fixedly connected to the transparent cover element 101 by any suitable means such as the locking ring 116.

Figure 10:
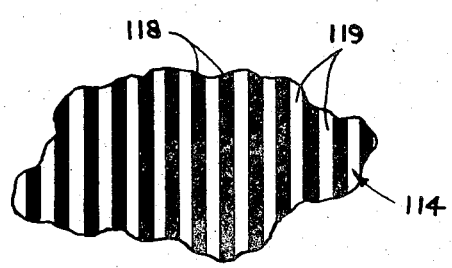
FIG. 10 is an exaggerated view of the lines on the gratings.

The respective black lines 118 and transparent lines 119 of the grating element are illustrated in FIG. 10 in exaggerated form. The grating 114 is mounted adjacent the grating 115 so that the gratings can be moved relative to each other that is grating 114 can be moved relative to grating 115 whenever the aneroid type member 109 is moved as described in the operation of the present device.

In operation, the absolute pressure of the pressure fluid in the cuff is transmitted through the inlet passage 106 to chamber 102 and by the capillary tube 112 and capillary passage 111 to the chamber 110 in the aneroid type member 109. Since these pressures are identical, the aneroid type member 109 will be in equilibrium and will not move.

Figure 9:
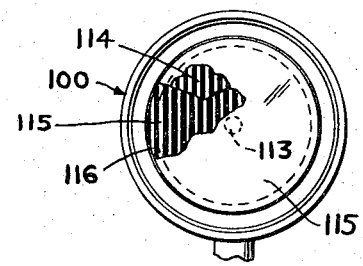
FIG. 9 is a front view of the device shown in FIG. 8.
Figure 13:
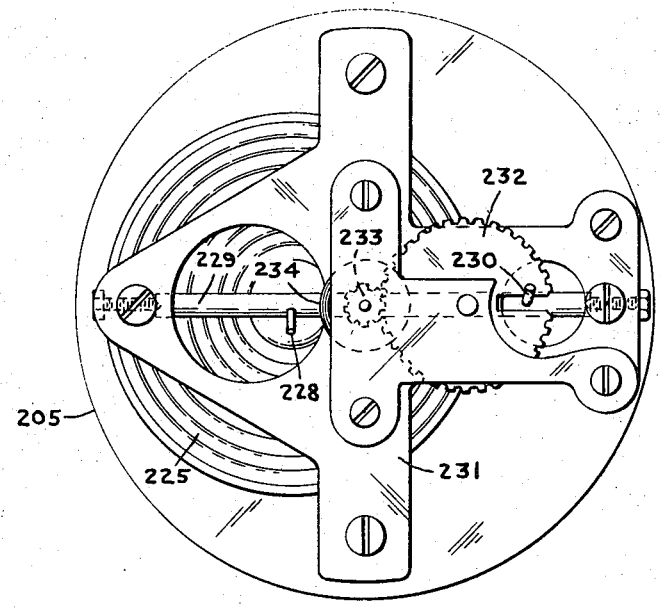
FIG. 13 is a plan view of the mechanical means for transmitting the movement of a bellows member to the rotating indicator of FIGS. 11 and 16.

However, when a pulse occurs in the occluded blood vessel coacting with the cuff 19, the increase in the pressure fluid in the cuff will be transmitted instantaneously to the chamber 102. However, the capillary tube 112 will be prevented from propagating this increase to chamber 110 of the aneroid type member 109 because the momentary increase in pressure in chamber 102 acts to compress the aneroid type member 109, in the same manner as has been described above for the operation of the aneroid type member in FIGS. 8 and 9 of the drawings.

When the pulse is completed since the absolute pressure in the pressure cuff is decreasing, then this absolute pressure will be transmitted both to chamber 102 and chamber 110. In order to reach equilibrium the aneroid type member 109 will expand moving connecting membrane 113 and the grating 114 directly proportional to the pressure induced by the pulse. The corresponding movement of grating 114, relative grating 115 will produce a visible change in the "moire" fringes from the zero position to indicate each respective pressure pulsation which occurs from the time they start until they cease.

If the cover means 101 is made of plexiglass or if other suitable transparent openings are provided therein to allow illumination to fall on the gratings 114 and 115 from the side remote from the side being observed, then the relative changes of the "moire" fringes will be easily visible.

It is believed obvious that the conventional differential pressure gauge can also be connected to the housing 100 in the same manner as shown in FIG. 6 of the invention so that the actual pressure readings in milimeters of mercury can be read when the "moire" fringes indicate pressure pulsations.

This form of the invention is advantageous because it eliminates utilizing any electrical means and requires only day light or other surrounding light to produce the desired indications of the pressure pulsations.

Further, since the "moire" movements are strictly periodic structures, and the movement of the aneroid members are themselves directly proportional to the pressure pulsations, the use of this type of optical amplifier will not require any special adjustments for the operation thereof.

In addition, the desired optical amplification can be adjusted within wide limits by the choice of the relative angle between the gratings 114 and 115. Proper adjustment for optical amplification will be that adapted to meet the minimum amplitude of pressure pulsations which will have to be detected in any circulatory system.

The ability to read the "moire" fringes can be increased by installing a small electrical light (not shown) in the system behind the gratings 114 and 115. However, this is not necessary if adequate daylight or electrical room illumination is present when the instrument is placed into use.

OTHER FORMS OF THE INVENTION WHEREIN THE CRITICAL PRESSURE VALUES ARE ESTABLISHED WITH VISIBLE MARKING DEVICES

The differential pressure transducer of the present invention as above described is also adapted to work or to operate or actuate and signal the pressure information to move sophisticated types of reading gauges which call attention to and preserve the critical pressure values signaled by the pressure transducer.

Figure 16:
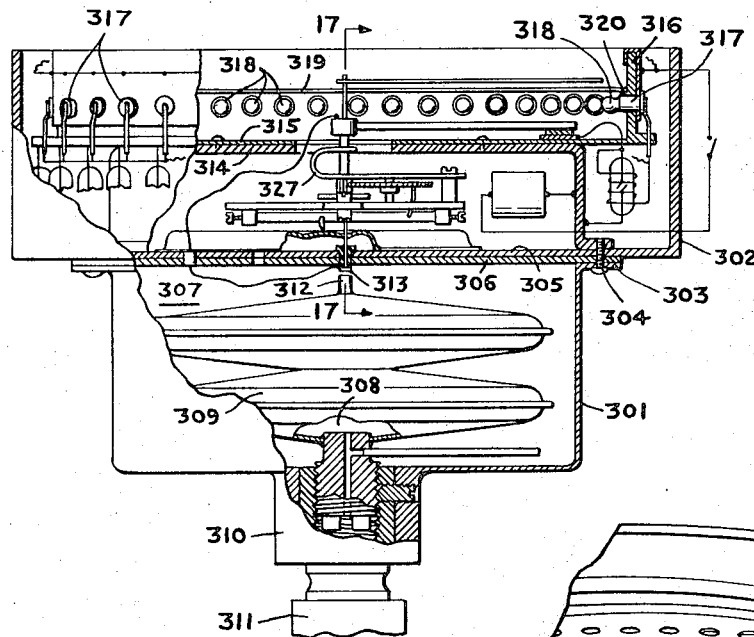
FIG. 16 is a still further form of the present invention in which the differential pressure transducer coacts with an electrical circuit having a visual means for indicating and recording variations in absolute pressure when the pulse oscillations occur in the circulatory system being monitored or measured.

In the forms of the inventions which are shown in FIGS. 11 and 16, such gauges are illustrated in detail.

In FIG. 11, the differential pressure transducer acts to actuate an electrical system which includes an electromagnetic means for visibly positioning tabs or markers on the reading gauge at the critical pressure values for the systolic and diastolic pressure values as well as the intermediate pressures therebetween.

In FIG. 16 instead of the reading gauge having indicating tabs, the gauge is provided with a lamp adjacent each of the critical pressures to be read which will light up and remain lit to indicate the readings.

In each instance, the tabs or lights as the case may be remain displayed for reference until they are reset by a manual reset means.

These forms of the invention will now be described.

FIGURE 11, FORM OF THE INVENTION

The device of FIG. 11, can be delineated into two sections, the differential pressure transducer section and the measuring or reading gauge section. These sections are each provided with cup-shaped housings as at 201 and 202.

The cup-shaped housing 201 of the differential pressure transducer section is smaller than that of the measuring gauge and is provided with a flange 203 about the open end of the housing which permits the larger cup-shaped housing 202 of the measuring or reading gauge to be attached in superposed relation to the housing 201 as by threaded members 204 which extends between the lower wall 205 of the cup-shaped housing 202 and the flange member 203.

Disposed between the flange 203 and the lower face 205 of the housing 202 is a cover or closure member 206 made of an insulating material which is held in assembled position between the respective housings 201 and 202 by the threaded members 204 and in assembled position forms a closed chamber with the housing element 201 as at 207.

Chamber 207 corresponds to chamber 66 as shown in the form of the invention illustrated at FIG. 6 of the drawings and this chamber coacts with chamber 208 formed in the double aneroid type pressure responsive em member 208a which is disposed in chamber 207 and mounted on the housing 201 in the identical manner to that above described for the form of the invention shown in FIG. 6 of the drawings. These chambers 207 and 208 form the respective main and auxiliary chambers of the differential pressure transducer section.

Since this portion of the invention shown in FIG. 11 is identical both in structure and operation to the elements as above described for FIG. 6, it is not deemed necessary to describe this further.

It is believed clear that the boss 209 provides means for connecting the adjustable differential pressure transducer portion of this form of the invention to the connecting conduit 210 which communicates with the conventional pressure cuff as is shown in FIG. 3 of the drawings.

At the end remote from the adjustable connecting connected end of the aneroid pressure responsive member 208 a movable contact 211 is provided which coacts with the stationary contact 212 mounted in a bore 213 extending through the lower wall 205 of cup shaped casing 202 and the insulating closure member 206 which forms the chamber 207 of the differential pressure transducer section of this form of the invention.

The movable contact 211 is fixed in adjusted position relative the stationary contact 212 by means of the set screw 209a and these contact elements will act as a switch in the circuit to be more fully described hereinafter, the function of which will be directly related to the actuation of the portions of the measuring gauge adapted to display and preserve those critical pressures which the instrument will be measuring.

In FIGS. 11 and 15, elements in the measuring gauge section include a support means 214 which is disposed a spaced distance from the lower wall 205 of the housing 202 as by any suitable bracket means 215, the support means 214 in turn supports an upper background plate 216 by means of space members 217.

The upper and background plate 216 has upper bearing means 218 centrally disposed therein to support the upper end of a rotatable shaft assembly 219 mounted at its lower end in the adjustable stationary contact 212 which serves as a combined thrust and journal bearing for the shaft assembly 219.

The shaft assembly 219 is rotated through a suitable arc by means of a linkage means actuated by the change in pressure in the chamber 207 as is shown in FIGS. 11, 13, 14 and 15 of the drawings.

Fixedly connected to the upper portion of the shaft assembly 219 is a pointer or arm 220 which is above the surface of the upper background plate 216 and will sweep through the same arc of rotation through which the shaft assembly 219 will rotate. Measurements can be read by reference to the position of the end of the pointer as it sweeps across the indicia 221 on a reading dial 222 formed by a flange on the inner wall of the housing 202.

If the indicia 221 are graduated in terms of mms of mercury, and established and arranged from zero to 400 mms Hgs, then, if properly calibrated, the true pressure measurements of the blood for the circulatory system being measured can be read by the position of the pointer 220.

A second arm 223 of a soft iron material is also fixedly connected to the shaft assembly 219 and rotates therewith and with the pointer 220. This arm 223 is in exact alinement with the pointer 220 but is disposed to rotate below the surface of the upper background plate 216 so that the end thereof can also sweep through the same arc as the pointer 220.

The mechanism for rotating the shaft assembly 219 includes a bellows means 225 mounted on the inner face of the lower wall 205 of the cup shaped housing 202 so as to form a pressure chamber 226 therewith.

Pressure air is delivered to the chamber 226 from the chamber 207 through a passage 227 which will be maintained sufficiently large so that the pressure acting in the chamber 226 will at all times be equivalent to the pressure acting in the pressure fluid in chamber 207.

Hence, the pressure in chamber 207 will vary in accordance with the pressure applied to the cuff (not shown) disposed in engagement with the circulatory system being measured in the manner above described for FIG. 3 of this invention, the bellows assembly 225 will expand and contract as a function of this same variation in pressure.

This movement of the bellows 225, is transmitted through a mechanical linkage which includes a rocker pin 228 on one side of a rocker bar 229 and a pivot pin 230 on the opposite side of the rocker bar 229.

Figure 14:
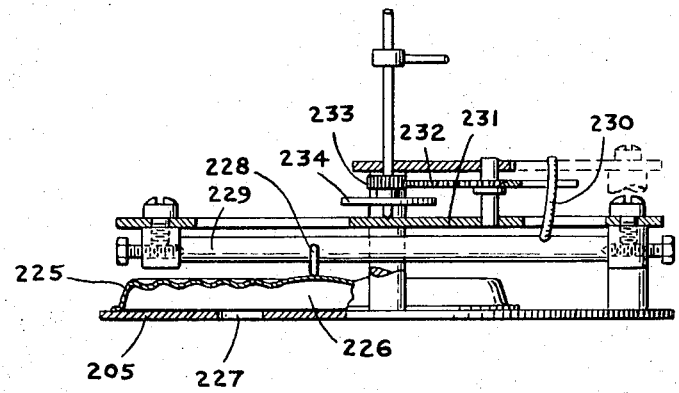
FIG. 14 is a side elevation partially in section of the mechanical transmitting means of FIG. 13.

The rocker bar 229 will be rotatably or pivotally connected to the lower support plate 231 connected to the lower wall 205 of the housing 202 as is clearly shown in FIGS. 14 and 15 of the drawings.

The pivot pin 230 coacts with a pivot gear 232 disposed to engage a pinion 233 fixedly connected to the shaft assembly 219 so that any rotation of the pinion 232 will be transmitted in equivalent amount to the shaft assembly 219.

In order to return to the shaft assembly 219 to the zero position, a return spring 234 is provided about the shaft assembly 219 and will operate like the conventional mainspring in a watch.

Thus, a simple mechanical leakage is provided to move the pointer 220 and the arm 223 through an arc which is equivalent to the applied pressure in the cuff (not shown).

Because the arm 223 is made of a soft iron material, it can serve as a core and forms an electromagnetic device when a coil 235 is formed thereon through which a suitable current is passed.

As an electromagnetic device, the end 236 is adapted to actuate and move tab members 237 pivotally connected as by flexible ring 238 to a suitable tab support flange 239 on the support means 214.

The tab member 237 is bistable in that when placed in the nonactuated position, it will remain in this position until moved into the actuated or indicating position as shown in FIG. 15 of the drawing. And it will remain in this actuated position until it is returned to the nonactuated position by means of a suitable reset mechanism which includes an annular reset member 240 which fits or slides in a groove 241 formed in the side wall of the housing 202.

The annular reset member 240 has a plurality of inwardly projecting portions 242 so disposed that when a reset pin 243 extending through a slot 244 in the lower wall 205 of the housing 202 is moved or rotated in the slot, the projections will engage and because of their rounded shape move or push the tabs 237 from the actuated to the nonactuated position.

The coil 235 has one end connected to the contact post 245 of the battery 246. The other contact 247 communicates as by line 248 to ground 249 formed by the housing 202 which through the threaded member 204 also serves to ground the housing 201. The other side of the coil 235, is connected as at 250 to the shaft assembly 219. It is believed clear that each time that the contact 211 engages the contact 212, that a closed circuit will be formed so as to pass current to the coil 235 and thereby render the soft iron member 223 magnetic and cause it to engage and draw that tab 227 which is adjacent to the end 236 from the nonactuated to the actuated position.

In operation, since the differential pressure transducer of this form of the invention is the same as that above described for the form of the invention shown in FIG. 6, when the pressure fluid is delivered to the cuff (not shown) this same pressure will act in the chambers 207 and chamber 208 in the aneroid type pressure responsive member 208a.

When the Korotkow pulses or oscillations occur once again the increase in absolute pressure in the cuff is transmitted instantaneously to the chamber 207 so as to momentarily compress the aneroid pressure responsive member 208a while the pulse is in progress. The propagation of the increased pressure due to the pulse will lag in chamber 208 formed in the aneroid pressure responsive member 208a because the increased pressure caused by this compression is transmitted to the associated capillary 208b which delivers the pressure to this chamber 208.

When the pulse is completed, the aneroid pressure responsive member 208a expands causing the contact 211 to be brought into engagement with the contact 212 thereby closing the circuit to the coil member 235.

This member will move at least one or more of the tabs 227 to the actuated or visible position as is illustrated in FIG. 15 of the drawings and because the tabs are bistable when pivoted to this position, they will remain in this position to indicate the readings for each Korotkow pulse or oscillation which occurs during the use of this measuring device.

Thus, the point at which the oscillations commence and the point at which they cease will be immediately visible as the shaft and its associated pointer 220 and member 223 are rotated through the arc of rotation in accordance with the pressure of the pressure fluid acting in the chamber 207.

When it is desired to reuse the instrument, the reset pin 243 is rotated in the slot 244. The annular reset member 240 and the projections 242 thereon will under this rotation pivot the tabs 227 from the actuated to the on nonactuated position and since the tabs are stable in the nonactuated position, they will remain in this position until actuated by the action of the electrical current circuit and the associated electromagnetic arm 223 as above described.

If the instrument is used with the conventional stethoscope the pressure values can be read at the time the Korotkow pulses or oscillations occur as discerned through the ear of the person operating the measuring gauge and this can be crosschecked by the visible display afforded by the tabs 227.

FIGURE 16, FORM OF THE INVENTION

Figure 17:
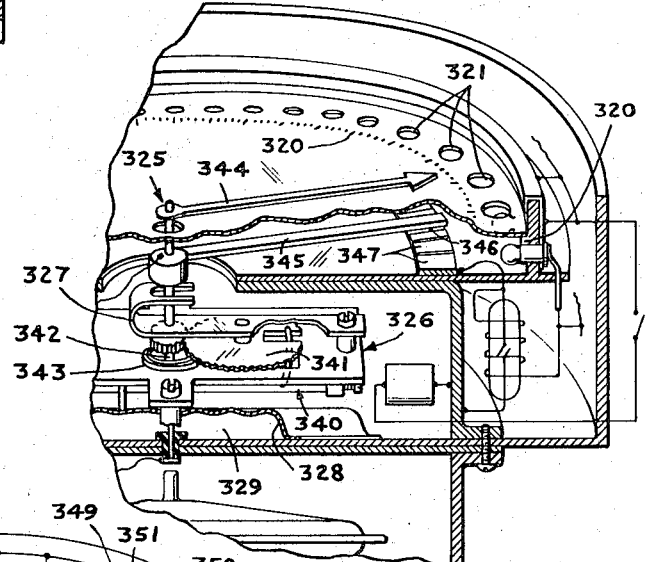
FIG. 17 is a fragmentary perspective of the form of the invention shown in FIG. 16 broken away in part to show a portion thereof in vertical section.

Referring now to FIGS. 16 and 17 of the drawings, the device there shown differs in that instead of tabs appearing at the significant pressure values, a light flashes and stays on at these positions.

FIG. 16 differs from FIG. 11, by replacing the electromagnetically operated tab means 227 of FIG. 11 with a plurality of illuminating devices such as light bulbs, spaced distances similar to those of the tab device shown in FIG. 11. The light bulbs can be lit and will remain lit at the significant pressure values for the purpose of accentuating and preserving these values until the reading dial or gauge is reset for another measurement.

In this form of the invention, the device once again can be delineated into two sections, namely the differential pressure transducer section and the measuring or reading gauge section.

These sections are provided with cup-shaped housings as at 301 and 302, the cup-shaped housing 301 holding the differential pressure transducer elements being smaller than that of the housing for the measuring or reading gauge section so that a flange 303 about the open end of the differential pressure transducer housing 301, will permit the larger cup-shaped housing 302 to be attached in superposed relation to the housing 301 as by threaded members 304 which extend between the lower wall 305 of cup-shaped housing 302 and the flange member 303.

Disposed between the flange 303 and the lower face 305 of the housing 302 is a cover or closure member 306 made of an insulating material which is held in assembled position between the respective housings 301 and 302 by the threaded members 304 as is clearly shown in FIGS. 16 and 17 of the drawings.

When the housing are in assembled position, a closed chamber is formed as at 307 in the housing 301 of the differential pressure transducer section.

Chamber 307 corresponds to chamber 66 as shown in the form of the invention illustrated at figure 6 of the drawings and this chamber coacts with chamber 308 formed in a double aneroid type pressure responsive member 309 which is disposed in chamber 307 and mounted to the housing 301 in the identical manner to that above described for the forms of the invention shown in FIGS. 6 and 11 of the drawings.

These chambers 307 and 308 form the respective main and auxiliary chambers of the differential pressure transducer section and as in the case of the form of the invention shown in FIG. 11, are identical both in structure and operation and accordingly, no further description is deemed necessary for an understanding thereof.

The boss 310 provides means for connecting the differential pressure transducer section of this form of the invention to the connecting conduit 311 which communicates with the conventional pressure cuff (not shown) as in FIG. 3 of the drawings.

At the end remote from the connected end of the aneroid pressure responsive member 309, a movable contact 312 is provided which coacts with the adjustable stationary contact 313 mounted in a bore 314 extending through the lower wall 305 of the cup-shaped housing 302 and the insulating closure member 306 as is shown in FIGS. 16 and 17 of the drawings.

The movable contact 312 and the stationary contact 313 will act as a switch in the circuit to be more fully described hereinafter, the function of which will be directly related to the actuation of the lamp portions of the measuring or reading gauge which display and preserve those critical pressures which the instrument is designed to measure.

The measuring or reading gauge section of the form of the invention shown in FIGS. 16 and 17 includes a support means 314, U-shaped in cross section with a laterally extending flange 315 thereon to provide means for mounting an annular member 316 which receives a plurality of lamp holding sockets 317 for the corresponding lamps 318. The lamp holding sockets 317 are disposed to extend radially inward for purposes which will appear clear hereinafter.

The support member 314 also serves to mount in superposed and spaced relation thereto a dial plate 319 which dial plate in assembled position has its periphery disposed to fit in snug engagement with a shoulder 320 formed on the radial inward face of the annular member 316 at a point just above the lamp holding sockets 317.

Thus, in assembled position, the lamps 318 will be mounted to extend into the closed space or chamber formed between the support member 314 and the superposed dial plate 319.

The dial plate on its outer face is provided with indicia 320 just inwardly of the periphery thereof which indicia are calibrated in mms of Hg and have associated therewith a plurality of circumferentially spaced openings 321, so positioned relative to the indicia and the lamps 318 that when the lamps are lit, they will illuminate the opening and permit visual identification of the reading at the particular indicia where the specific lamp opening 321 indicates the lamp as being lit.

A shaft assembly 325 and a mechanical driving and return assembly 326 similar to that above described for the form of the invention shown in FIG. 11, is also provided in this form of the invention. The shaft assembly 325 provides means for coacting between the movable contact 311 and adjustable stationary contact 312 and an electrical circuit for actuating the lamps as now will be described.

The shaft assembly 325 is mounted to engage the stationary contact 313 at one end and the mechanical driving and return assembly has an upper bearing support 327 for the shaft assembly.

As in the corresponding means provided in FIG. 11, the bellows member 328 forms a chamber 329 which receives pressure corresponding to that acting in the chamber 307 and when the walls of the bellows member are caused to expand such movement is transmitted through a suitable mechanical linkage generally designated 340 to the rocker gear 341 and pinion 342 whereby the shaft assembly 325 will be rotated through a predetermined degree of arcuate movement as a function of the relative expansion movement of the walls of the bellows means 328.

The return spring 343 is provided for returning the shaft assembly to the equivalent zero position of its arcuate movement when the pressure is reduced in chamber 329.

The shaft assembly 325 extends through the dial plate 319 and receives at this end a pointer or indicator arm 344 which is fixedly connected and rotatable with the shaft assembly so that it rotates through the same degree of arcuate movement through which the shaft assembly is rotated by the movement of the bellow member 328. The end of the pointer or indicator arm 344 coacts with the indicia 320 so that the indicia can be read accurately when the instrument is being utilized.

Also connected to the shaft assembly 319 is a contact arm 345 which is connected as at the hub at a point along the shaft assembly which permits the contact arm 345 to rotate through its arc in a position between the space formed between the support member 314 and the dial plate 319 a is clearly shown in FIGS. 16 and 17 of the drawings.

The pointer member 344 and the contact arm 345 are in alinement with each other and hence, move through identical arcs when the shaft assembly is rotated responsive to the action of bellows member 328.

The end of the contact arm remote from the end connected to the shaft assembly has a contact face 346 which is moved with the contact arm 345 over a plurality of stationary contact pads 347 disposed in spaced relation corresponding to the spaced relation of the lamp members 318 with which they are operatively associated, as one of the switching means therefor, in a circuit, illuminating such associated light at those particular pressures which are significant during the operation of this device.

When the movable contact face 346 on the contact arm 345 is disposed in engagement with any contact pad 347, it forms part of an electrical current carrying circuit which will be actuated to light that lamp 318 associated with the particular contact pad 347 if at the same moment the movable contact 312 is brought into engagement with the adjustable stationary contact 313.

Figure 18:
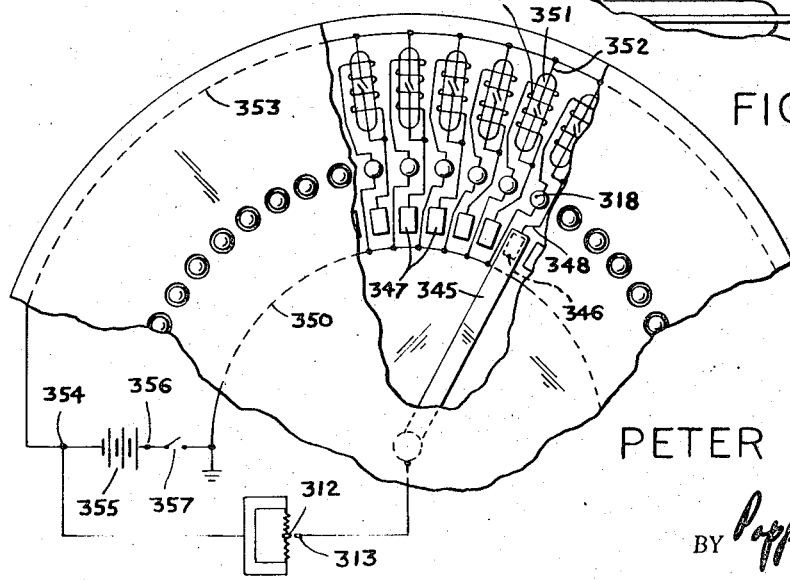
FIG. 18 is a schematic diagram of the electrical circuit for FIG. 16.

The differential pressure transducer DPT is illustrated diagrammatically in FIG. 18 to show that the movable contact element 312 is connected to ground and the stationary contact 313 to the rotatable contact arm 345.

If switch 357 is closed, then whenever the contact face 346 on the contact arm 345 is in contact with a contact pad 347 and the movable contact 312 is actuated into engagement with the stationary contact 313 current will pass through line 348 to the coil 349 and thence, to the lamp 318 associated with the particular contact pad. However, because the coil 349 will by electromagnetic action simultaneously actuate the relay 351 to closed position, current will also flow from the battery 355 to the coil 349 through the relay 351.

Then, when the control arm 345 is rotated to the next pad, the particular lamp 318 now lit will by reason of the closed condition of the associated relay 351 continue in its lighted condition and permit the instrument to repeat the operation for the next lamp should a pulse occur which actuates the movable contact 312 to engagement with the stationary contact 313.

Thus, the initial flow of current through the coil not only lights the lamp but in addition establishes a circuit parallel to the initial circuit which acts to a maintain the associated lamp in its lighted condition. When the sliding contact arm 345 moves to the next contact pad 347 this condition will occur successively from contact pad to contact pad and its associated lamp so that for any series of pulses, there will an initial light at a given pressure $P_s$ and a plurality of successive lights thereafter to the point where the pulses cease at which point $Pd$, no further contact being made between the contacts 312 and 313, the further lighting of successive lamps will automatically cease.

In order to render all circuits open and thus, turn off the lamps, a switch 357 is provided which opens the ground connection of the battery 352. When such switch 357 is operated it places the instrument in condition for taking another measurement.

In operations, the differential pressure transducer section of this form of the invention, is the same as that above described for the form of the invention shown in FIG. 6. Thus, when pressure fluid is delivered to the cuff, (not shown), this same pressure will act in chamber 307 and chamber 308 in the aneroid type pressure responsive member 309.

When Korotkow pulses or oscillations occur once again, the increase over absolute pressure in the cuff is transmitted instantaneously to 307 so as to momentarily compress the aneroid pressure responsive member 309.

The propagation of this momentary increase in pressure due to the pulse will lag in chamber 308 formed in the aneroid pressure responsive member 309 because the increased pressure caused by the compression will be transmitted to the capillary 308$b$ which delivers the pressure to the chamber 308.

When the pulse is completed and the pressure in 307 and 308 starts to equalize, the aneroid pressure responsive member 309 expands causing the movable contact 312 to be brought into engagement with the stationary contact 313.

At the time this occurs, the contact arm 345 will be moving the contact face 346 across a particular contact pad 347 and this will act to close the circuit to the coil 349 and light the associated lamp 318 as has been above described. The associated lamp 318 and successive lamps will continue to remain lit by reason of the action of the respective relays 351 for these associated circuits and thus, at the point at which the oscillations commence $P_s$ and the point at which the oscillations cease $P_d$ readings on the dial will be immediately visible as the shaft assembly 319 and its associated pointer 344 and contact arm 345 are rotated in the corresponding arcs in accordance with the pressure of the pressure fluid acting in the chambers 307 and 329.

When it is desired to reuse the instrument, the switch 357 is actuated to open the circuit. The lights will go out and the instrument will then be in order for further reuse.

If the instrument is used with the conventional stethoscope, the pressure values can be read at the time the Korotkow pulses or oscillations occur as discerned through the ear of the person operating the instrument.

In the differential pressure transducers DPT illustrated in each form of the present invention, there has been provided a main chamber and an auxiliary chamber and the means for forming these chambers is so constructed as to provide at least one common wall which will flex when there is a pressure difference between such main chamber and the auxiliary chamber.

The volume relationships of these chambers can be adapted for optimum results for any differential pressure which exists therebetween. Such optimum results are obtained if the auxiliary chamber has a volume at least equal to the volume in the pressure cuff which occludes the circulatory system being measured.

Since it is difficult to maintain a small cuff volume as a practical matter, it has been found as illustrated in FIG. 2a of the drawings that if the auxiliary chamber is made as large as possible relative the main chamber it will optimize the effect of differential pressure between these chambers in the operative relationship of the differential pressure transducer with other elements of the present device.

The specific ratios which apply to each particular form of the invention must be reached empirically and no specific ratios therefore, can be given other than to say that the auxiliary chamber should be much greater in volume than the main chamber in the construction of the differential pressure transducer.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

I claim:

1. In an apparatus for measuring blood pressure in a circulatory system the combination of:
    a. a cuff for applying pressure at a point in the circulatory system wherein the pressure is to be measured;
    b. a conduit connected to said cuff for delivering air thereto under pressure for inflating said cuff;
    c. valve means in said conduit for bleeding air from said cuff whereby the pressure in said cuff can be reduced to atmospheric pressure at any predetermined rate;
    d. a differential pressure transducer having means therein forming a main chamber;
    e. conduit means connecting said main chamber means directly to the pressure fluid conduit and the cuff to permit pressure air delivered and released from said cuff at the pressure fluid connection end of the cuff to act uniformly in said main chamber means;
    f. said pressure transducer having an auxiliary chamber means with at least one flexible wall common to the means forming said main chamber in said pressure transducer;
    g. an elongated capillary means connected at one end to said auxiliary chamber;
    h. said elongated capillary means disposed to lie concentric with said conduit means and having the end remote from said connected end communicating with the pressure fluid conduit means;
    i. said capillary means coacting with said main chamber means whereby momentary fluctuations in pressure in the pressure fluid in said cuff are not transmitted to said auxiliary chamber means and the differential pressure between said main chamber and said auxiliary chamber will actuate movement of said flexible means; and
    j. signal means to be actuated in response to movement of said flexible means.

2. In the apparatus as claimed in claim 1, wherein said capillary means comprises, an elongated tube of predetermined length and having a sized opening therethrough of predetermined internal diameter.

3. In the apparatus as claimed in claim 1, wherein:
    a. said flexible means has a contact connected to and movable therewith;
    b. and said signal means includes an electrical current carrying circuit normally maintained open;
    c. and said electrical current carrying means includes at least one contact to coact with said movable contact on said flexible means to close said electrical current carrying circuit when said flexible means is actuated; and
    d. at least one visual signal means in said electric current carrying circuit to be operated each time said electric current carrying circuit is closed.

4. In an apparatus as claimed in claim 1, wherein:
    a. the main chamber means in the differential pressure transducer is formed by a flexible member; and
    b. the auxiliary chamber means is formed by a closure member connected in the apparatus about the flexible member;
    c. means for adjusting the said closure member in said apparatus to permit movement thereof towards and away from the flexible member.

5. In an apparatus according to claim 4, wherein said current carrying contact is disposed on the closure member and is adjustable therewith.

6. In the apparatus as claimed in claim 1, wherein:
    a. the signal means comprises an optical amplifier; and
    b. means connecting said optical amplifier to said flexible member whereby said optical amplifier will be actuated to signal each oscillation of said flexible means.

7. In an apparatus as claimed in claim 1, wherein:
    a. the signal means comprises a visual indicating means;
    b. said visual indicating means including an optical amplifier having a fixed grating and a movable grating;
    c. means connecting said fixed grating in said apparatus to prevent the movement thereof;
    d. means connecting said movable grating to the flexible means on said pressure transducer; and
    e. said movable grating operatively associated with said fixed grating whereby oscillation of said flexible means will produce variable visual signals for observation.

8. In the apparatus for measuring blood pressure as claimed in claim 1, wherein:
    a. the signal means comprises a visual indicating means, the visual indicating means includes a current carrying circuit;
    b. a gauge having indicia thereon calibrated to provide pressure graduations;
    c. a plurality of tab means pivotally mounted at spaced intervals equivalent to the indicia on said gauge;
    d. means operatively connected between said current carrying circuit and said differential pressure transducer to actuate successively any number of said tab means at predetermined pressure conditions as signaled by fluctuations of the flexible wall of said differential pressure transducer; and
    e. means to reset said tab means to their nonactuated positions.

9. In an apparatus for measuring blood pressure as claimed in claim 8, wherein said reset means includes,
    a. an annular member;
    b. means connected to said annular member and extending externally of said apparatus to permit said annular member to be rotated relative the tab means; and
    c. means on said annular member disposed to contact said tab means on rotation of the annular member to return each of said tab means to their nonactuated position.

10. In the apparatus for measuring blood pressure as claimed in claim 1, wherein:
    a. the signal means comprises a visual indicating means;
    b. a gauge having calibrated pressure indicia thereon;
    c. said visual indicating means includes a plurality of lamp means disposed in spaced relation equivalent to said calibrated indicia and to coact with said indicia to provide pressure readings on said gauge;

d. said plurality of lamp means connected to and lighted by a current carrying circuit;

e. means operatively connected between said current carrying circuit and said differential pressure transducer to actuate successively any number of said light means at predetermined pressure conditions as signaled by fluctuations of the flexible wall of said differential pressure transducer; and f. means to deactuate said current carrying circuit whereby said lamp means are turned off.